US012272474B2

(12) United States Patent
Hong et al.

(10) Patent No.: US 12,272,474 B2
(45) Date of Patent: Apr. 8, 2025

(54) NON-ORIENTED ELECTRICAL STEEL SHEET AND MANUFACTURING METHOD THEREFOR

(71) Applicant: POSCO Co., Ltd, Pohang-si (KR)

(72) Inventors: Jaewan Hong, Pohang-si (KR); Hyungdon Joo, Pohang-si (KR); Junesoo Park, Pohang-si (KR)

(73) Assignee: POSCO CO., LTD, Pohang-si (KR)

( * ) Notice: Subject to any disclaimer, the term of this patent is extended or adjusted under 35 U.S.C. 154(b) by 0 days.

(21) Appl. No.: 18/268,784

(22) PCT Filed: Dec. 16, 2021

(86) PCT No.: PCT/KR2021/095126

§ 371 (c)(1),
(2) Date: Jul. 14, 2023

(87) PCT Pub. No.: WO2022/139567

PCT Pub. Date: Jun. 30, 2022

(65) Prior Publication Data

US 2024/0296981 A1 Sep. 5, 2024

(30) Foreign Application Priority Data

Dec. 21, 2020 (KR) ........................ 10-2020-0179366

(51) Int. Cl.

| | |
|---|---|
| ***H01F 1/147*** | (2006.01) |
| ***C21D 6/00*** | (2006.01) |
| ***C21D 8/12*** | (2006.01) |
| ***C21D 9/46*** | (2006.01) |
| ***C22C 38/00*** | (2006.01) |
| ***C22C 38/02*** | (2006.01) |
| ***C22C 38/04*** | (2006.01) |
| ***C22C 38/06*** | (2006.01) |
| ***C22C 38/14*** | (2006.01) |

(52) U.S. Cl.

CPC ......... *H01F 1/14791* (2013.01); *C21D 6/005* (2013.01); *C21D 6/008* (2013.01); *C21D 8/1222* (2013.01); *C21D 8/1233* (2013.01); *C21D 8/1261* (2013.01); *C21D 9/46* (2013.01); *C22C 38/001* (2013.01); *C22C 38/002* (2013.01); *C22C 38/004* (2013.01); *C22C 38/02* (2013.01); *C22C 38/04* (2013.01); *C22C 38/06* (2013.01); *C22C 38/14* (2013.01); *C21D 2211/005* (2013.01); *C22C 2202/02* (2013.01)

(58) Field of Classification Search

None

See application file for complete search history.

(56) References Cited

FOREIGN PATENT DOCUMENTS

| | | | | |
|---|---|---|---|---|
| JP | H06-192731 | A | | 7/1994 |
| JP | 2002-115034 | A | | 4/2002 |
| JP | 2002-371340 | A | | 12/2002 |
| JP | 2006-060935 | A | | 3/2006 |
| JP | 2009-185357 | A | | 8/2009 |
| JP | 2018-115362 | A | | 7/2018 |
| JP | 2018178197 | A | * | 11/2018 |
| KR | 10-2004-0026041 | A | | 3/2004 |
| KR | 10-2013-0076546 | A | | 7/2013 |
| KR | 10-2014-0041833 | A | | 4/2014 |
| KR | 10-2015-0073798 | A | | 7/2015 |
| KR | 1020150073798 | | * | 7/2015 |
| KR | 10-2016-0044452 | A | | 4/2016 |
| KR | 10-2018-0011809 | A | | 2/2018 |
| KR | 10-2019-0077891 | A | | 7/2019 |
| KR | 10-2062184 | B1 | | 1/2020 |
| KR | 10-2020-0076831 | A | | 6/2020 |
| WO | 2020/111006 | A1 | | 6/2020 |

OTHER PUBLICATIONS

International Search Report dated Apr. 6, 2022 issued in International Patent Application No. PCT/KR2021/095126 (with English translation).

Office Action dated Aug. 30, 2024, issued in corresponding Indian Patent Application No. 202337046860 with an English translation.

* cited by examiner

*Primary Examiner* — Seth Dumbris

(74) *Attorney, Agent, or Firm* — Morgan, Lewis & Bockius LLP

(57) ABSTRACT

A non-oriented electrical steel sheet according to an exemplary embodiment of the present invention contains, by wt %, 0.005% or less (excluding 0%) of C, 1.2 to 2.7% of Si, 0.4 to 2.0% of Mn, 0.005% or less (excluding 0%) of S, 0.3% or less (excluding 0%) of Al, 0.005% or less (excluding 0%) of N, 0.005% or less (excluding 0%) of Ti, and a balance of Fe and inevitable impurities, wherein the non-oriented electrical steel sheet satisfies the following Expression 1, and a volume fraction of grains having an angle of 15° or less between a {112} plane and a rolling plane in the steel sheet is 40 to 60%.

$$0.3 \le ([Si]+[Al]-1.5)/[Mn] \le 0.85 \qquad \text{[Expression 1]}$$

(In Expression 1, [Si], [Al], and [Mn] represent contents (wt %) of Si, Al, and Mn, respectively.)

4 Claims, No Drawings

NON-ORIENTED ELECTRICAL STEEL SHEET AND MANUFACTURING METHOD THEREFOR

CROSS-REFERENCE OF RELATED APPLICATIONS

This application is the U.S. National Phase under 35 U.S.C. § 371 of International Patent Application No. PCT/KR2021/095126, filed on Dec. 16, 2021, which in turn claims the benefit of Korean Application No. 10-2020-0179366, filed on Dec. 21, 2020, the disclosures of which applications are incorporated by reference herein.

TECHNICAL FIELD

An exemplary embodiment of the present invention relates to a non-oriented electrical steel sheet and a method for manufacturing the same. More particularly, an exemplary embodiment of the present invention relates to a non-oriented electrical steel sheet that is obtained by omitting hot-rolled sheet annealing, and at the same time, has improved magnetism, and a method for manufacturing the same.

BACKGROUND ART

A motor or generator is an energy conversion device that converts electrical energy into mechanical energy or mechanical energy into electrical energy, and recently, in accordance with strengthening of regulations on environmental conservation and energy saving, a demand for improving the efficiency of the motor or generator has increased. Accordingly, there is an increasing demand for development of a material that is used as an iron core material for such a motor, generator, or small transformer and has more excellent properties in a non-oriented electrical steel sheet.

For the motor or generator, energy efficiency refers to a ratio of input energy to output energy. In order to improve the efficiency, it is important to consider how much energy loss such as iron loss, copper loss, and mechanical loss, which are substantially lost in the energy conversion process, may be reduced, and the reason is that the iron loss and copper loss among them are considerably influenced by properties of the non-oriented electrical steel sheet. Typical magnetic properties of the non-oriented electrical steel sheet are iron loss and magnetic flux density, as the iron loss of the non-oriented electrical steel sheet decreases, the iron loss lost in a process of magnetizing an iron core decreases, resulting in improvement of efficiency, and since as the magnetic flux density increases, a larger magnetic field may be induced with the same energy, and a less current may be applied to obtain the same magnetic flux density, copper loss is reduced, such that energy efficiency may be improved. Therefore, in order to improve the energy efficiency, development of a non-oriented electrical steel sheet with excellent magnetism having low iron loss and high magnetic flux density is indispensable.

As an efficient method for reducing the iron loss of the non-oriented electrical steel sheet, there is a method of increasing the amount of Si, Al, and Mn added, which are elements having high resistivity. However, an increase in the amount of Si, Al, and Mn added increases the resistivity of the steel, and eddy current loss of the iron loss of the non-oriented electrical steel sheet is reduced, such that it is possible to reduce the iron loss, but the iron loss does not unconditionally decrease in proportion to the addition amount as the addition amount increases, and on the contrary, since an increase in the amount of alloying elements added causes deterioration of the magnetic flux density, it is not easy to secure excellent magnetic flux density while reducing iron loss even when the component system and manufacturing process are optimized. However, texture improvement is a method capable of simultaneously improving iron loss and magnetic flux density without sacrificing one of the iron loss and magnetic flux density. To this end, in the non-oriented electrical steel sheet having excellent magnetism, a technology for improving a texture by performing a hot-rolled sheet annealing process before cold rolling a hot-rolled sheet after hot rolling a slab has been widely used. However, this method also causes an increase in manufacturing cost due to addition of the hot-rolled sheet annealing process, and has problems such as deterioration of cold rollability when grains are coarsened by performing the hot-rolled sheet annealing. Therefore, when a non-oriented electrical steel sheet having excellent magnetism may be manufactured without performing a hot-rolled sheet annealing process, the manufacturing costs may be reduced, and the problem of productivity according to the hot-rolled sheet annealing process may be solved.

DISCLOSURE

Technical Problem

An exemplary embodiment of the present invention provides a non-oriented electrical steel sheet and a method for manufacturing the same.

Specifically, an exemplary embodiment of the present invention provides a non-oriented electrical steel sheet that is obtained by omitting hot-rolled sheet annealing, and at the same time, has improved magnetism, and a method for manufacturing the same.

Technical Solution

An exemplary embodiment of the present invention provides a non-oriented electrical steel sheet containing, by wt %, 0.005% or less (excluding 0%) of C, 1.2 to 2.7% of Si, 0.4 to 2.0% of Mn, 0.005% or less (excluding 0%) of S, 0.3% or less (excluding 0%) of Al, 0.005% or less (excluding 0%) of N, 0.005% or less (excluding 0%) of Ti, and a balance of Fe and inevitable impurities, wherein the non-oriented electrical steel sheet satisfies the following Expression 1, and a volume fraction of grains having an angle of 15° or less between a {112} plane and a rolling plane in the steel sheet is 40 to 60%.

$$0.3 \le ([Si] + [Al] - 1.5)/[Mn] \le 0.85 \quad \text{[Expression 1]}$$

(In Expression 1, [Si], [Al], and [Mn] represent contents (wt %) of Si, Al, and Mn, respectively.)

A concentration layer containing Si oxide, Al oxide, or Si and Al composite oxide may exist in a depth range of 0.2 μm or less from a surface.

The total amount of Si and Al in the concentration layer may be 1.5 times or more than that of a substrate.

An average grain diameter of the non-oriented electrical steel sheet according to an exemplary embodiment of the present invention may be 50 to 120 μm.

Another exemplary embodiment of the present invention provides a method for manufacturing a non-oriented electrical steel sheet, the method including: heating a slab containing, by wt %, 0.005% or less (excluding 0%) of C, 1.2 to 2.7% of Si, 0.4 to 2.0% of Mn, 0.005% or less (excluding 0%) of S, 0.3% or less (excluding 0%) of Al, 0.005% or less (excluding 0%) of N, 0.005% or less (excluding 0%) of Ti, and a balance of Fe and inevitable impurities, and satisfying the following Expression 1; manufacturing a hot-rolled sheet by hot rolling the slab; bending the hot-rolled sheet; manufacturing a cold-rolled sheet by cold rolling the hot-rolled sheet; and subjecting the cold-rolled sheet to final annealing.

An elongation in the bending of the hot-rolled sheet may be 0.1 to 0.5%.

$$0.3 \leq ([Si] + [Al] - 1.5)/[Mn] \leq 0.85 \quad \text{[Expression 1]}$$

(In Expression 1, [Si], [Al], and [Mn] represent contents (wt %) of Si, Al, and Mn, respectively.)

Annealing the hot-rolled sheet may not be included between the manufacturing of the hot-rolled sheet and the manufacturing of the cold-rolled sheet.

In the heating of the slab, when an equilibrium temperature at which austenite is 100% transformed into ferrite is Ae1 (° C.), a slab heating temperature SRT (° C.) and the Ae1 temperature (° C.) may satisfy the following relation.

$$SRT \geq Ae1 + 150° \text{ C.}$$

In the heating of the slab, the slab may be maintained in an austenite single-phase region for 1 hour or longer.

The hot rolling may include rough rolling and finishing rolling, and a finishing rolling start temperature (FET) may satisfy the following relation.

$$Ae1 \leq FET \leq (2 \times Ae3 + Ae1)/3$$

(Where, Ae1 represents a temperature (° C.) at which austenite is completely transformed into ferrite, Ae3 represents a temperature (° C.) at which austenite begins to transform into ferrite, and FET represents a finishing rolling start temperature (° C.).)

The hot rolling may include rough rolling and finishing rolling, and a reduction ratio of the finishing rolling may be 85% or more.

The hot rolling may include rough rolling and finishing rolling, and a reduction ratio at a front stage of the finishing rolling may be 70% or more.

The hot rolling may include rough rolling and finishing rolling, and a deviation of a finishing rolling end temperature (FDT) in the entire length of the hot-rolled sheet may be 30° C. or lower.

The hot rolling may include rough rolling, finishing rolling, and coiling, and a temperature (CT) in the coiling may satisfy the following relation.

$$0.55 \leq CT \times [Si]/1000 \leq 1.75$$

(Where, CT represents a temperature (° C.) in the coiling, and [Si] represents a content (wt %) of Si.)

After the hot rolling, a maximum number of times of repeated bending in a 90° repeated bending test of the hot-rolled sheet may be 30 times or more, and may satisfy the following relation with a thickness of the hot-rolled sheet.

$$\text{Maximum number of times of repeated bending/thickness (mm) of hot-rolled sheet} \geq 1.5$$

In the repeated bending of the hot-rolled sheet, the repeated bending may be performed 5 times or more.

Advantageous Effects

According to an exemplary embodiment of the present invention, even when the hot-rolled sheet annealing process of the non-oriented electrical steel sheet is omitted, the magnetism is excellent.

MODE FOR INVENTION

The terms "first", "second", "third", and the like are used to describe various parts, components, regions, layers, and/or sections, but are not limited thereto. These terms are only used to differentiate a specific part, component, region, layer, or section from another part, component, region, layer, or section. Accordingly, a first part, component, region, layer, or section which will be described hereinafter may be referred to as a second part, component, region, layer, or section without departing from the scope of the present invention.

Terminologies used herein are to mention only a specific exemplary embodiment, and are not to limit the present invention. Singular forms used herein include plural forms as long as phrases do not clearly indicate an opposite meaning. The term "comprising" used in the specification concretely indicates specific properties, regions, integers, steps, operations, elements, and/or components, and is not to exclude the presence or addition of other specific properties, regions, integers, steps, operations, elements, and/or components.

When any part is positioned "on" or "above" another part, it means that the part may be directly on or above the other part or another part may be interposed therebetween. In contrast, when any part is positioned "directly on" another part, it means that there is no part interposed therebetween.

In addition, unless otherwise stated, % means wt %, and 1 ppm is 0.0001 wt %.

In an exemplary embodiment of the present invention, the meaning of "further containing an additional element" means that the additional element is substituted for a balance of iron (Fe) by the amount of additional element added.

Unless defined otherwise, all terms including technical terms and scientific terms used herein have the same meanings as understood by those skilled in the art to which the present invention pertains. Terms defined in a generally used dictionary are additionally interpreted as having the meanings matched to the related technical document and the currently disclosed contents, and are not interpreted as ideal or very formal meanings unless otherwise defined.

Hereinafter, exemplary embodiments of the present invention will be described in detail so that those skilled in the art to which the present invention pertains may easily practice the present invention. However, the present invention may be implemented in various different forms and is not limited to exemplary embodiments described herein.

A non-oriented electrical steel sheet according to an exemplary embodiment of the present invention contains, by wt %, 0.005% or less (excluding 0%) of C, 1.2 to 2.7% of Si, 0.4 to 2.0% of Mn, 0.005% or less (excluding 0%) of S, 0.3% or less (excluding 0%) of Al, 0.005% or less (excluding 0%) of N, 0.005% or less (excluding 0%) of Ti, and a balance of Fe and inevitable impurities.

Hereinafter, the reason for limiting the components of the non-oriented electrical steel sheet will be described.

C: 0.005 wt % or Less

Carbon (C) combines with Ti to form carbides, resulting in deterioration of magnetism, and may cause a decrease in efficiency of electrical equipment due to an increase in iron loss caused by magnetic aging when used after processing from a final product to an electrical product. Therefore, C is set to 0.005 wt % or less. More specifically, C may be contained in an amount of 0.0001 to 0.0045 wt %.

Si: 1.2 to 2.7 wt %

Silicon (Si) is a main element added to reduce eddy current loss of iron loss by increasing resistivity of steel. When the amount of Si added is too small, iron loss is deteriorated. On the other hand, when the amount of Si added is too large, an austenite region is reduced. Therefore, in a case where a hot-rolled sheet annealing process is omitted, an upper limit of Si may be limited to 2.7 wt % in order to utilize a phase transformation phenomenon. More specifically, Si may be contained in an amount of 1.80 to 2.60 wt %.

Mn: 0.4 to 2.0 wt %

Manganese (Mn) is an element that reduces the iron loss by increasing the resistivity along with Si, Al, and the like, and improves the texture. When the amount of Mn added is small, the effect of increasing the resistivity is low, and unlike Si and Al, since Mn is an element that stabilizes austenite, it is required to add an appropriate amount of Mn according to the amount of Si and Al added. When the amount of Mn is excessive, the magnetic flux density may be greatly reduced. More specifically, Mn may be contained in an amount of 0.80 to 1.50 wt %.

S: 0.005 wt % or Less

Sulfur (S) is an element that forms sulfides such as MnS, CuS, and (Cu, Mn)S that are harmful to magnetic properties, and therefore, S may be added as little as possible. When the amount of S added is too large, the magnetism may be deteriorated due to an increase in fine sulfides. More specifically, S may be contained in an amount of 0.0001 to 0.0030 wt %.

Al: 0.30 wt % or Less

Aluminum (Al) plays an important role in reducing iron loss by increasing the resistivity along with Si, but is an element that stabilizes ferrite more than Si and greatly reduces the magnetic flux density as an addition amount thereof increases. In an exemplary embodiment of the present invention, hot-rolled sheet annealing is omitted by utilizing a phase transformation phenomenon, and therefore, a content of Al is limited. However, when Al is added by partially replacing Si, it is advantageous in forming an oxide layer, such that it is possible to partially replace Si. Therefore, the amount of Al added may be limited to 0.30 wt % or less. More specifically, Al may be contained in an amount of 0.0001 to 0.20 wt %.

N: 0.005 wt % or Less

Nitrogen (N) is an element that is unfavorable for magnetism such as forming nitrides by combining with Al, Ti, and the like to inhibit grain growth, and therefore, a small amount of N may be contained. More specifically, N may be contained in an amount of 0.0001 to 0.0030 wt %.

Ti: 0.005 wt % or Less

Titanium (Ti) combines with C and N to form fine carbides and nitrides, which inhibits grain growth, and as the amount of Ti added increases, a texture is deteriorated due to increased carbides and nitrides, resulting in deterioration of magnetism. Therefore, a small amount of Ti may be contained. More specifically, Ti may be contained in an amount of 0.0001 to 0.0030 wt %.

In addition to the above elements, P, Sn, and Sb, which are known as elements that improve a texture, may be added to further improve magnetism. However, when the amount of these elements added is too large, grain growth is suppressed, and productivity is deteriorated, and therefore, the amount of elements added may be controlled so that each element is added in an amount of 0.1 wt % or less.

Copper (Cu) is an element that forms (Mn, Cu)S sulfides together with Mn. When the amount of Cu added is large, fine sulfides are formed, which causes deterioration of magnetism, and therefore, the amount of Cu added may be limited to 0.02 wt % or less. More specifically, Cu may be contained in an amount of 0.0015 to 0.019 wt %.

Ni, Cr, and Nb, which are elements inevitably added in the steelmaking process, react with impurity elements to form fine sulfides, carbides, and nitrides to adversely affect magnetism, and thus, a content of each of these elements may be limited to 0.05 wt % or less.

In addition, since Zr, Mo, V, and the like are strong carbonitride-forming elements, it is preferable to not be added as much as possible, and each of these elements should be contained in an amount of 0.01 wt % or less.

The balance contains Fe and inevitable impurities. The inevitable impurities are impurities to be incorporated in the steelmaking process and the manufacturing process of the grain-oriented electrical steel sheet and are well known in the art, and thus, a specific description thereof will be omitted. In an exemplary embodiment of the present invention, the addition of elements other than the alloy components described above is not excluded, and various elements may be contained within a range in which the technical spirit of the present invention is not impaired. In a case where additional elements are further contained, these additional elements are contained by replacing the balance of Fe.

In an exemplary embodiment of the present invention, the non-oriented electrical steel sheet may satisfy the following Expression 1.

$$0.3 \leq ([Si] + [Al] - 1.5)/[Mn] \leq 0.85 \quad \text{[Expression 1]}$$

(In Expression 1, [Si], [Al], and [Mn] represent contents (wt %) of Si, Al, and Mn, respectively.)

Al has a significantly large effect of stabilizing ferrite, and thus, the total content of Si+Al should be limited. When Expression 1 is satisfied, the steel sheet may have a sufficient austenite single-phase region at a high temperature, and may secure a recrystallized structure after hot rolling through phase transformation during hot rolling. In addition, when Expression 1 is satisfied, it is possible to control formation of an oxide layer by controlling the atmosphere in an annealing furnace during final annealing.

In an exemplary embodiment of the present invention, a volume fraction of grains having an angle of 15° or less between a {112} plane and a rolling plane in the steel sheet may be 40 to 60%. In an exemplary embodiment of the present invention, the hot-rolled sheet annealing is omitted, such that the volume fraction of grains having an angle of 15° or less between a {112} plane and a rolling plane increases. However, the magnetism may be improved by controlling an alloy composition and process conditions described below. More specifically, a volume fraction of grains in which a {112} plane is parallel to the rolling plane within 15° in the steel sheet may be 43.0 to 57.0%.

In an exemplary embodiment of the present invention, a concentration layer containing Si oxide, Al oxide, or Si and Al composite oxide may exist in a depth range of 0.2 μm or less from a surface. Since the concentration layer containing Si oxide, Al oxide, or Si and Al composite oxide deteriorates magnetism, it is required to control a thickness to be formed as thinly as possible. In an exemplary embodiment of the present invention, a thickness of the concentration layer may be 0.20 μm or less. More specifically, the thickness of the concentration layer may be 0.01 to 0.15 μm.

The total amount of Si and Al in the concentration layer may be 1.5 times or more than that of a substrate. A content of O may be 5 wt % or more. The concentration layer is different from the substrate of the steel sheet in that the total amount of Si and Al in the concentration layer is 1.5 times or more than that of the substrate and the content of O is 5 wt % or more. A method for controlling the concentration layer will be described in detail in a method for manufacturing a non-oriented electrical steel sheet described below.

In addition, an average grain diameter of the non-oriented electrical steel sheet according to an exemplary embodiment of the present invention may be 50 to 120 μm. In an exemplary embodiment of the present invention, a grain diameter may be measured based on a plane parallel to a rolling plane (ND plane). The grain diameter refers to a diameter of a circle assuming a virtual circle having the same area as the grain.

A method for controlling the grain diameter will be described in detail in a method for manufacturing a non-oriented electrical steel sheet described below.

The non-oriented electrical steel sheet according to an exemplary embodiment of the present invention has excellent iron loss and magnetic flux density due to the alloy components and characteristics described above.

Specifically, an iron loss (W15/50) when a magnetic flux density of 1.5 Tesla is induced at a frequency of 50 Hz may be 3.50 W/Kg or less. More specifically, the iron loss (W15/50) may be 2.30 to 3.50 W/Kg.

A magnetic flux density (B50) induced when a magnetic field of 5,000 A/m is applied may be 1.660 Tesla or more. More specifically, the magnetic flux density (B50) may be 1.660 to 1.750 Tesla. A measurement standard thickness of the magnetism may be 0.50 mm.

A method for manufacturing a non-oriented electrical steel sheet according to an exemplary embodiment of the present invention includes: heating a slab; manufacturing a hot-rolled sheet by hot rolling the slab; bending the hot-rolled sheet; manufacturing a cold-rolled sheet by cold rolling the hot-rolled sheet; and subjecting the cold-rolled sheet to final annealing.

Hereinafter, each step will be described in detail.

Since alloy components of the slab are described in the alloy components of the non-oriented electrical steel sheet described above, repeated descriptions will be omitted. The alloy components are not substantially changed in the manufacturing process of the non-oriented electrical steel sheet, and thus, the alloy components of the non-oriented electrical steel sheet and the slab are substantially the same.

Specifically, the slab may contain, by wt %, 0.005% or less (excluding 0%) of C, 1.2 to 2.7% of Si, 0.4 to 2.0% of Mn, 0.005% or less (excluding 0%) of S, 0.3% or less (excluding 0%) of Al, 0.005% or less (excluding 0%) of N, 0.005% or less (excluding 0%) of Ti, and a balance of Fe and inevitable impurities, and may satisfy the following Expression 1.

$$0.3 \leq ([Si] + [Al] - 1.5)/[Mn] \leq 0.85 \qquad \text{[Expression 1]}$$

(In Expression 1, [Si], [Al], and [Mn] represent contents (wt %) of Si, Al, and Mn, respectively.)

Since the other additional elements are described in the alloy components of the non-oriented electrical steel sheet, repeated descriptions will be omitted.

In the heating of the slab, when an equilibrium temperature at which austenite is 100% transformed into ferrite is Ae1 (° C.), a slab heating temperature SRT (° C.) and the Ae1 temperature (° C.) may satisfy the following relation.

$$SRT \geq Ae1 + 150° \text{ C.}$$

When the slab heating temperature is high enough to satisfy the above range, it is possible to sufficiently secure a recrystallized structure after hot rolling, and even when hot-rolled sheet annealing is not performed, magnetism may be improved.

The Ae1 temperature (° C.) is determined by the alloy components of the slab. Since this is widely known in the art, a detailed description thereof will be omitted. For example, the Ae1 temperature may be calculated with a commercial thermodynamics programs such as Thermo-Calc., Factsage.

When a slab reheating temperature is too high, precipitates are re-dissolved and finely precipitated during the hot rolling and annealing processes, and when the slab reheating temperature is too low, it is advantageous to coarsen precipitates, but hot rollability is deteriorated, and it is difficult to secure a recrystallized structure after hot rolling due to not securing a sufficient phase transformation section.

In the heating of the slab, the slab may be maintained in an austenite single-phase region for 1 hour or longer. This is a time required for coarsening precipitates, is also required to coarsening the recrystallized structure after hot rolling by coarsening a crystallized group of austenite before hot rolling.

Next, a hot-rolled sheet is manufactured by hot rolling the slab. Specifically, the manufacturing of the hot-rolled sheet by hot rolling the slab may include rough rolling, finishing rolling, and coiling.

In an exemplary embodiment of the present invention, a reduction ratio and a temperature in each of the rough rolling, finishing rolling, and coiling are appropriately controlled, such that the magnetism may be improved even when hot-rolled sheet annealing is not performed.

First, the rough rolling is a step of subjecting the slab to rough rolling to manufacture a bar.

The finishing rolling is a step of rolling the bar to manufacture a hot-rolled sheet.

The coiling is a step of coiling the hot-rolled sheet.

When the phase transformation is finished, in the rolling in the finishing rolling, a transformed structure remains as it is, which refines a microstructure of the non-oriented electrical steel sheet, and also causes deterioration of a texture, resulting in a significant deterioration of the magnetism. On the other hand, in a case where the phase transformation excessively occurs in the finishing rolling, when grains having the hot-rolled recrystallized structure are refined, the effect of improving the texture due to strain energy decreases, and finally, the magnetism is greatly deteriorated.

When a finishing rolling start temperature (FET) satisfies the following relation, after the final annealing, a cube, goss, and rotated cube, which are advantageous textures for magnetism among the textures, may be better developed to improve the magnetism.

$$Ae1 \leq FET \leq (2 \times Ae3 + Ae1)/3$$

Where, Ae1 represents a temperature (° C.) at which austenite is completely transformed into ferrite, Ae3 represents a temperature (° C.) at which austenite begins to transform into ferrite, and FET represents a finishing rolling start temperature (° C.).

The Ae1 temperature (° C.) and the Ae3 temperature are determined by the alloy components of the slab.

In addition, a reduction ratio of the finishing rolling may also contribute to the texture development described above. Specifically, the reduction ratio of the finishing rolling may be 85% or more. When the finishing rolling includes a plurality of passes, the reduction ratio of the finishing rolling may be a cumulative reduction ratio of the plurality of passes. More specifically, the reduction ratio of the finishing rolling may be 85 to 90%.

A reduction ratio at a front stage of the finishing rolling may be 70% or more. The front stage of the finishing rolling refers to up to (total number of passes)/2 when the finishing rolling is performed with two or more even passes. When the finishing rolling is performed with two or more odd passes, the front stage of the finishing rolling refers to up to (total number of passes+1)/2. More specifically, the reduction ratio at the front stage of the finishing rolling may be 70 to 87%.

A deviation of a finishing rolling end temperature (FDT) in the entire length of the hot-rolled sheet may be 30° C. or lower. That is, a difference between the maximum temperature and the minimum temperature among the finishing rolling end temperatures may be 30° C. or lower. As such, the deviation of the finishing rolling end temperature (FDT) is controlled to be small, such that area fractions of fine grains and coarse grains after final annealing may be controlled. As a result, the magnetism is excellent without the hot-rolled sheet annealing. More specifically, the deviation of the finishing rolling end temperature (FDT) in the entire length of the hot-rolled sheet may be 15 to 30° C.

In addition, controlling a temperature in the coiling may contribute to the control of the area fractions of fine grains and coarse grains after final annealing. Specifically, the temperature (CT) in the coiling may satisfy the following relation.

$$0.8 \leq CT \times [\mathrm{Si+Al}]/1000 \leq 2.2$$

Where, CT represents a temperature (° C.) in the coiling, and [Si+Al] represents a content (wt %) of Si+Al.

A microstructure and repeated bending properties of the hot-rolled sheet may be improved by controlling the finishing rolling end temperature and coiling temperature described above. In an exemplary embodiment of the present invention, since the hot-rolled sheet annealing process is not performed, the microstructure of the hot-rolled sheet has a great influence on a microstructure of a non-oriented electrical steel sheet to be finally manufactured.

A thickness of the hot-rolled sheet may be 2.0 to 3.0 mm. More specifically, the thickness of the hot-rolled sheet may be 2.3 mm to 2.5 mm.

A maximum number of times of repeated bending in a 90° repeated bending test of the hot-rolled sheet may be 30 times or more, and may satisfy the following relation with a thickness of the hot-rolled sheet.

Maximum number of times of repeated bending≥15× thickness (mm) of hot-rolled sheet When the maximum number of times of repeated bending is too small, it is difficult to properly secure a target magnetism. The maximum number of times of repeated bending may be determined by the alloy components and slab heating and hot rolling conditions of the steel sheet described above.

The 90° repeated bending test is conducted by using a 20 mm×120 mm specimen and a method of measuring a maximum number of times of bending until fracture occurs with a bending radius of 10 mmR, and is to measure the extent to which a bending strain may be applied to the material. The higher the number of times, the more bending strain may be applied to the steel sheet.

Next, the hot-rolled sheet is subjected to bending. In this case, tension is applied before the start of cold rolling, and repeated bending is performed 5 times or more. As described above, in an exemplary embodiment of the present invention, it is possible to manufacture a non-oriented electrical steel sheet having excellent magnetism by controlling the alloy composition and various processes even without the hot-rolled sheet annealing.

At this time, an elongation by the repeated bending may be 0.1 to 0.5%. When the elongation is too low, the effect of improving the microstructure by bending may not be large. When the elongation is too high, a non-uniform elongation is applied to the material, which may cause surface and property problems. More specifically, the elongation may be 0.2 to 0.4%.

In this case, the applied tension may be 250 to 4,000 kgf based on a width of 1,000 mm.

Annealing the hot-rolled sheet may not be included between the manufacturing of the hot-rolled sheet and the manufacturing of the cold-rolled sheet. That is, in an exemplary embodiment of the present invention, annealing the hot-rolled sheet may be omitted. Specifically, the temperature of the steel sheet may be maintained at 300° C. or lower between the manufacturing of the hot-rolled sheet and the manufacturing of the cold-rolled sheet.

Next, a cold-rolled sheet is manufactured by cold rolling the hot-rolled sheet.

In the cold rolling, the hot-rolled sheet is subjected to final rolling to a thickness of 0.10 mm to 0.70 mm. If necessary, secondary cold rolling may be performed after primary cold rolling and intermediate annealing, and a final reduction ratio may be in a range of 50 to 95%.

Next, the cold-rolled sheet is subjected to final annealing. An annealing temperature in the process of annealing the cold-rolled sheet is not particularly limited as long as it is a temperature that is generally applied to a non-oriented electrical steel sheet. The iron loss of the non-oriented electrical steel sheet is closely related to a grain size, and thus, the annealing temperature is suitably 900 to 1,100° C. When the temperature is too low, grains are too fine, which causes an increase in hysteresis loss, and when the temperature is too high, grains are too coarse, which causes an increase in eddy loss, resulting in deterioration of iron loss.

After the final annealing, an insulating coating film may be formed. The insulating coating film may be treated with organic, inorganic, and organic/inorganic composite coating films, and may be treated with other insulating coating agents.

Hereinafter, the present invention will be described in more detail with reference to Examples. However, these Examples are only for illustrating the present invention, and the present invention is not limited thereto.

Example 1

Slabs containing the alloy components summarized in Table 1, and a balance of Fe and inevitable impurities were manufactured. The slabs were heated at 1,150° C., the heated slabs were hot rolled to thicknesses summarized in Table 2, and then the hot-rolled sheets were coiled. The coiled hot-rolled steel sheets were subjected to bending 5 times or more before/after pickling without hot-rolled sheet annealing, the bent hot-rolled steel sheets were processed at elongations summarized in Table 2, the processed hot-rolled steel sheets were cold rolled to thicknesses of 0.5 mm, and then the cold-rolled steel sheets were finally subjected to cold-rolled sheet annealing at temperatures summarized in Table 2 for about 80 seconds.

The iron loss W15/50, the magnetic flux density B50, the texture phase characteristics are summarized in Table 2.

Each measurement method was as follows.

An Epstein specimen having a length of 305 mm and a width of 30 mm for magnetism measurement was formed from the manufactured final annealed sheet in an L direction (rolling direction) and a C direction (direction perpendicular to the rolling direction).

In addition, in order to measure the texture, a portion corresponding to 5 to 10% from the surface was etched, and a 5 mm×5 mm region was observed using EBSD.

TABLE 1

| Steel type | C | Si | Mn | S | Al | Ti | N | Value of Expression 1 |
|---|---|---|---|---|---|---|---|---|
| Comparative Material 1 | 0.0017 | 2.70 | 0.251 | 0.0015 | 0.461 | 0.0016 | 0.0015 | 6.61 |
| Comparative Material 2 | 0.0013 | 2.28 | 1.08 | 0.0013 | 0.003 | 0.0014 | 0.001 | 0.73 |
| Comparative Material 3 | 0.0021 | 1.79 | 1.87 | 0.0021 | 0.132 | 0.0010 | 0.0021 | 0.22 |
| Comparative Material 4 | 0.0013 | 2.25 | 0.76 | 0.0018 | 0.273 | 0.0015 | 0.0014 | 1.34 |
| Comparative Material 5 | 0.0008 | 2.54 | 1.38 | 0.0013 | 0.005 | 0.0014 | 0.0016 | 0.75 |
| Inventive Steel 1 | 0.0021 | 2.16 | 1.09 | 0.0016 | 0.152 | 0.0015 | 0.0017 | 0.74 |
| Inventive Steel 2 | 0.0015 | 2.32 | 1.11 | 0.0014 | 0.003 | 0.0014 | 0.0014 | 0.74 |
| Inventive Steel 3 | 0.002 | 2.33 | 1.11 | 0.0017 | 0.008 | 0.0015 | 0.0012 | 0.75 |
| Inventive Steel 4 | 0.0009 | 2.26 | 1.27 | 0.0009 | 0.193 | 0.0014 | 0.0011 | 0.75 |
| Inventive Steel 5 | 0.0012 | 2.41 | 1.32 | 0.0015 | 0.117 | 0.0015 | 0.0017 | 0.77 |
| Inventive Steel 6 | 0.0013 | 2.5 | 1.31 | 0.0012 | 0.004 | 0.0015 | 0.001 | 0.77 |
| Inventive Steel 7 | 0.0014 | 2.51 | 1.3 | 0.0018 | 0.006 | 0.0015 | 0.001 | 0.78 |
| Inventive Steel 8 | 0.0007 | 2.33 | 1.25 | 0.001 | 0.173 | 0.0015 | 0.0013 | 0.80 |

TABLE 2

| Steel type | Hot-rolled sheet thickness (mm) | Maximum number of times of repeated bending | Elongation (%) | Final annealing temperature (° C.) | Iron loss W15/50 | Magnetic flux density B50 (T) | {112} fraction (%) |
|---|---|---|---|---|---|---|---|
| Comparative Material 1 | 2.3 | 27 | 0 | 1010 | 3.52 | 1.667 | 62.88 |
| Comparative Material 2 | 2.5 | 42 | 0 | 1010 | 3.54 | 1.662 | 61.67 |
| Comparative Material 3 | 2.3 | 49 | 0 | 980 | 3.73 | 1.677 | 70.54 |
| Comparative Material 4 | 2.5 | 31 | 0.1 | 1010 | 3.66 | 1.672 | 65.38 |
| Comparative Material 5 | 2.3 | 39 | 0.7 | Cold rolling was impossible | | | |
| Inventive Steel 1 | 2.5 | 49 | 0.3 | 1010 | 2.82 | 1.690 | 52.24 |

TABLE 2-continued

| Steel type | Hot-rolled sheet thickness (mm) | Maximum number of times of repeated bending | Elongation (%) | Final annealing temperature (° C.) | Iron loss W15/50 | Magnetic flux density B50 (T) | {112} fraction (%) |
|---|---|---|---|---|---|---|---|
| Inventive Steel 2 | 2.5 | 48 | 0.2 | 1010 | 2.91 | 1.689 | 51.42 |
| Inventive Steel 3 | 2.5 | 46 | 0.1 | 1010 | 2.94 | 1.692 | 55.49 |
| Inventive Steel 4 | 2.5 | 51 | 0.5 | 980 | 2.86 | 1.682 | 47.04 |
| Inventive Steel 5 | 2.5 | 51 | 0.4 | 1010 | 2.7 | 1.687 | 51.71 |
| Inventive Steel 6 | 2.5 | 40 | 0.5 | 1010 | 2.84 | 1.676 | 49.72 |
| Inventive Steel 7 | 2.3 | 43 | 0.3 | 1010 | 2.76 | 1.685 | 44.55 |
| Inventive Steel 8 | 2.3 | 45 | 0.1 | 1010 | 2.64 | 1.683 | 47.63 |

As shown in Tables 1 and 2, in Inventive Steels 1 to 8 in which all the alloy components and the manufacturing process suggested in an exemplary embodiment of the present invention were satisfied, it could be confirmed that the volume fraction of grains having an angle of 15° between the {112} plane and the rolling plane was properly formed, and the magnetism was finally excellent.

In Comparative Material 1 in which the amount of Mn added was excessively large and the amount of Al added was excessively small, it could be confirmed that the value of Expression 1 was not satisfied and the number of times of bending was small, and thus, a large amount of {112} grains was generated, and the magnetism was deteriorated.

In Comparative Material 2, it could be confirmed that the alloy components were appropriate, but the elongation during bending was low, and thus, a large amount of {112} grains was generated, and the magnetism was deteriorated.

In Comparative Materials 3 and 4, it could be confirmed that the value of Expression 1 was not satisfied, and thus, the magnetism was deteriorated.

In Comparative Material 5, the elongation during bending was high, and thus, cold rolling was impossible.

The present invention is not limited to the exemplary embodiments, but may be manufactured in various different forms, and it will be apparent to those skilled in the art to which the present invention pertains that various modifications and alterations may be made without departing from the spirit or essential feature of the present invention. Therefore, it is to be understood that the exemplary embodiments described hereinabove are illustrative rather than restrictive in all aspects.

The invention claimed is:

1. A non-oriented electrical steel sheet comprising, by wt %, 0.005% or less (excluding 0%) of C, 1.2 to 2.7% of Si, 0.4 to 2.0% of Mn, 0.005% or less (excluding 0%) of S, 0.3% or less (excluding 0%) of Al, 0.005% or less (excluding 0%) of N, 0.005% or less (excluding 0%) of Ti, and a balance of Fe and inevitable impurities, wherein the non-oriented electrical steel sheet satisfies the following Expression 1, and a volume fraction of grains having an angle of 15° or less between a {112} plane and a rolling plane in the steel sheet is 40 to 60%, $$0.3 \leq ([Si]+[Al]-1.5)/[Mn] \leq 0.85 \quad \text{[Expression 1]}$$

(in Expression 1, [Si], [Al], and [Mn] represent contents (wt %) of Si, Al, and Mn, respectively).

2. The non-oriented electrical steel sheet of claim 1, wherein:

a concentration layer containing Si oxide, Al oxide, or Si and Al composite oxide exists in a depth range of 0.2 μm or less from a surface.

3. The non-oriented electrical steel sheet of claim 2, wherein:

the total amount of Si and Al in the concentration layer is 1.5 times or more than that of a substrate.

4. The non-oriented electrical steel sheet of claim 1, wherein:

an average grain diameter is 50 to 120 μm.

* * * * *